United States Patent
Beatty et al.

[15] 3,664,859
[45] May 23, 1972

[54] PULSED METHOD FOR IMPREGNATION OF GRAPHITE

[72] Inventors: Ronald L. Beatty, Oak Ridge; Dale V. Kiplinger, Concord, both of Tenn.

[73] Assignee: The United States of America as represented by the United States Atomic Energy Commission

[22] Filed: Mar. 4, 1969

[21] Appl. No.: 804,265

[52] U.S. Cl. .................. 117/46 CG, 23/209.1, 117/106 R
[51] Int. Cl. .................................................. C01b 31/00
[58] Field of Search.................. 117/46 CC, 46 CG, 106 R; 23/209.1, 209.4

[56] References Cited

UNITED STATES PATENTS

| | | |
|---|---|---|
| 2,789,038 | 4/1957 | Bennett et al............................117/46 |
| 3,471,314 | 10/1969 | Beatty et al..............................117/46 |
| 3,107,973 | 10/1963 | Bickerdike et al....................23/209.1 |
| 3,172,774 | 3/1965 | Diefendorf..............................117/46 |
| 3,206,331 | 9/1965 | Diefendorf..............................117/46 |
| 3,158,499 | 11/1964 | Jenkin................................117/107.2 |

*Primary Examiner*—William D. Martin
*Assistant Examiner*—M. Sofocleous
*Attorney*—Roland A. Anderson

[57] ABSTRACT

An improved method for preparing carbon-impregnated graphite bodies is provided comprising pulsing the graphite bodies between a vacuum atmosphere and a pressurized hydrocarbon atmosphere at elevated temperatures. The resulting graphite bodies, which are impregnated with pyrolytic carbon deposits, have helium permeabilities of less than $1 \times 10^{-11}$ cm$^2$/sec.

1 Claims, No Drawings

PULSED METHOD FOR IMPREGNATION OF GRAPHITE

BACKGROUND OF THE INVENTION

The invention described herewith was made in the course of, or under, a contract with the U.S. Atomic Energy Commission. It relates generally to methods for preparing graphite impregnated bodies and more particularly to a pulsed method for impregnating such bodies.

Owing to its excellent thermal stability, thermal conductivity and acceptable nuclear properties, graphite has found widespread general utility as a reactor material, being used chiefly as a moderator or reflector. It is, however, relatively porous and therefore must be sealed for certain reactor applications.

One nuclear application of interest, in which graphite having special properties would be most useful, is as a construction material for a molten salt type reactor, such as a molten salt breeder reactor. One of the requirements for graphite to be used in a molten salt breeder reactor is a surface having low permeability to prevent xenon absorption. Calculations indicate that a helium permeability of less than $10^{-8}$ cm$^2$/sec. at the graphite surface will be required to keep the xenon concentration in the core to the desired level. Since commercially available graphites usually have permeabilities six to seven orders of magnitude higher than the required level, it is necessary to find some means for sealing the graphite surfaces. One such method proposed the laying down of a metal coating, such as molybdenum and niobium. Such metal coatings, however, impose neutron absorption penalties. Carbon is a more desirable material for this application and has heretofore been employed in reducing graphite permeability by well known thermal decomposition of selected hydrocarbons. Such prior art processes, however, had in common the deficiency of lack of deposit penetration to any substantial depth. Also, the character of the base graphite usually was different from the deposited carbon so that thermal or neutron induced dimensional changes in the materials present problems. Finally, in another approach a pyrolytic carbon surface coating was deposited over the graphite structure; the coating, however, was subject to spalling during irradiation and thus was unsuitable for providing low permeability graphite. It is, therefore, the object of this invention to provide an improved method for impregnating porous graphite with pyrolytic carbon employing thermal decomposition techniques.

SUMMARY OF THE INVENTION

Applicants have found that subjecting a porous graphite body alternately to a vacuum atmosphere and a pressurized hydrocarbon atmosphere at elevated temperatures resulted in an impregnated graphite structure which had extremely low permeability. Graphite bodies pulsed between vacuum for 4 to 60 seconds (< 29 in. Hg.) and undiluted 1,3-butadiene for one-half to 1 second at a pressure of 20 psig in the temperature range of 750° to 1,000° C for a total contact time of 1–2 hours were found to have permeabilities of less than $10^{-11}$ cm$^2$/sec. for helium at room temperature. High temperature treatment at 3,000° C followed by reimpregnation of these graphite bodies resulted in helium permeability still less than $10^{-11}$ cm$^2$/sec. No measurable thickness of coating was observed on the outside of the impregnated graphite bodies thus indicating that deposition occurred within the pores.

DESCRIPTION OF THE PREFERRED EMBODIMENTS

The type graphite useful in carrying out this invention may vary widely. Where the graphite is to be used in a molten salt breeder reactor, a nuclear grade graphite such as POCO-AXF which is commercially available from POCO Graphite, Inc. may be used as the starting structure which is to be impregnated.

The method of this invention may be carried out in conventional equipment, such as an induction coil around a silica tube which is closed at each end by means of a solenoid valve, one being connected to a vacuum pump and the other to a source of hydrocarbon gas. A pulse timer, which automatically switches the system between vacuum and hydrocarbon atmosphere at preset intervals, may be used to control the two solenoids. A porous graphite body which may be of any convenient size or shape, is suspended in the silica tube furnace. The silica tube furnace is maintained within a narrow temperature range, which is hereinafter discussed in greater detail, and is evacuated by opening one solenoid to initiate the vacuum phase of the process. The system pressure for this vacuum phase of the process is not narrowly critical provided a pressure is used which is adequate to provide outgassing of the porous graphite body during this cycle; a vacuum of less than 29 in. of Hg is quite suitable. The duration of the vacuum phase is equally not narrowly critical with a time of about 4 to 60 seconds being quite adequate.

After the vacuum phase is completed the porous graphite bodies are next exposed to a pressurized hydrocarbon atmosphere to initiate the impregnation phase of the process. Inasmuch as the furnace is maintained at an elevated temperature throughout each phase of the process, the hydrocarbon, which is supplied to the interior of the furnace by way of the second solenoid, is thermally decomposed, depositing pyrolytic carbon within the pores of the porous graphite body. In order to be within the scope of this invention the hydrocarbon gas and deposition temperature must be selected so as to provide a deposit which is pyrolytic carbon. Only when this type carbon is deposited within the pores will the hereinbefore noted problem — thermal or neutron induced dimensional changes in the materials due to the carbon deposit being different from the base graphite — be alleviated. The temperature for this phase is critical and should be maintained within the range of about 750° to 1,000° C. Temperatures above 1,000° C result in a carbon coating rather than impregnation while at temperatures below 750° C the process becomes undesirably slow when 1,3-butadiene is used as carbon source. The useful processing temperature range may be different for other hydrocarbons. The hydrocarbon may vary widely in this step provided the deposit is pyrolytic carbon. Many of the well known thermally decomposable hydrocarbons either in pure form or diluted with an appropriate inert gas, such as helium, may be equally employed in this phase to produce a pyrolytic carbon deposit. Hydrocarbons having a high carbon-to-hydrogen by-product volume ratio, such as butadiene or acetylene, are preferred. The system pressure is not narrowly critical for this pressurized phase. Employing 1,3-butadiene a system pressure of about 20 psig is quite suitable.

The cycle between vacuum and hydrocarbon atmospheres is repeated until a highly impermeable graphite body is achieved. Total contact times of 1 to 2 hours are suitable and result in a graphite body which has a helium permeability of less than $10^{-11}$ cm$^2$/sec.

The following examples are provided to explain the invention in greater detail.

EXAMPLE I

The feasibility of impregnating porous graphite structures with pyrolytic carbon by pulsing between a vacuum and a hydrocarbon atmosphere at elevated temperatures was demonstrated as follows:

Several runs were made by suspending a porous graphite specimen, 0.4 in. O.D., 0.125 in. I.D., and 0.5 in. long, in the hereinbefore described silica tube furnace by a graphite support rod. The graphite specimens had approximately 18 per cent pore volume, i.e., density of 1.84 gm/cm$^3$, and had essentially all pores less than 1 micron in size. Impregnation of the pores of the graphite specimen was effected by pulsing between 15 seconds of vacuum (< 29 in. Hg) and a pressure of 20 psig undiluted 1,3-butadiene at a temperature of 800° C.

After a total hydrocarbon exposure time of 2 hours, the specimen was removed from the furnace and leak tested by clamping onto a helium mass spectrometer leak detector. The specimen had a leak rate less than $4.5 \times 10^{-11}$ std. cm$^3$/sec. of helium corresponding to a permeability of less than $1.0 \times 10^{-11}$ cm$^2$/sec. and had no measurable thickness of coating on the outside indicating that the deposition had occurred within the pores. Radiographs of cross sections of two graphite specimens, before and after impregnation, were taken after each specimen had been subjected to high pressure mercury (500 psi Hg). Mercury penetrated the porous area to make an opaque area in the radiographs. The entire section of the specimen, which was untreated, was penetrated by mercury, and the area of the impregnated specimen, to a depth of 0.030 in., was transparent to X-rays indicating the absence of mercury penetration.

EXAMPLE II

A graphite specimen of the same size and density as Example I, but having pores as large as 17 microns in size was exposed in the silica furnace alternately to vacuum (< 29 in. Hg) and undiluted 1,3-butadiene at 950° C as described in Example I. After a period of 60 minutes exposure to the hydrocarbon, the specimen was removed from the furnace and leak tested as described in Example I. The specimen had a leak rate less than $4.5 \times 10^{-11}$ std. cm$^3$/sec. of helium corresponding to a permeability of less than $1.0 \times 10^{-11}$ cm$^2$/sec. and again the diameter of the specimen had not increased.

The impregnated specimen was then heated to 2,000° C in argon for 5 minutes. The dimensions of the specimen remained the same and the helium leak rate increased to $5 \times 10^{-9}$ std. cm$^3$/sec. The specimen was then reimpregnated with carbon as above. Thereafter, the specimen was leak tested and no leak was detected which meant that the helium permeability was less than $10^{-11}$ cm$^2$/sec.

It will be understood that the invention is not intended to be limited to the specific embodiments given by way of illustration of the process but that it may be modified within the scope of the appended claims.

What is claimed is:

1. A method of reducing the permeability of a porous graphite article by depositing pyrolytic carbon in the pores of the graphite article, comprising the steps of confining the porous graphite article in an enclosed volume, evacuating the volume to a pressure less than atmospheric pressure for a duration in the range of 4 to 60 seconds to outgas the graphite article, charging the evacuated volume with gaseous 1,3-butadiene at a pressure of about 20 psig for a duration of 0.5 to 1.0 second for the gaseous 1,3-butadiene to penetrate pores in the graphite article, heating the confined graphite article during the volume evacuating and charging steps to a temperature in the range of 750°–1,000° C. to thermally decompose the gaseous hydrocarbon in the pores and convert the decomposed hydrocarbon to pyrolytic carbon, and successively and repetitively continuing said volume evacuating and charging steps at the end of each of said durations for a period of time in the range of 1 to 2 hours.

* * * * *